(12) United States Patent
Sato et al.

(10) Patent No.: US 6,247,716 B1
(45) Date of Patent: Jun. 19, 2001

(54) PHASE DIFFERENCE DETECTING APPARATUS AND WHEELCHAIR USING THE SAME

(75) Inventors: Katsutoshi Sato, Mishima; Atsushi Takahashi, Yokohama, both of (JP)

(73) Assignee: Kabushiki Kaisha TEC, Tagata-gun (JP)

(*) Notice: Subject to any disclaimer, the term of this patent is extended or adjusted under 35 U.S.C. 154(b) by 0 days.

(21) Appl. No.: 09/170,283

(22) Filed: Oct. 13, 1998

(30) Foreign Application Priority Data

Oct. 13, 1997 (JP) .................................. 9-278450

(51) Int. Cl.[7] ................. B62M 1/14; B62D 11/00; B62D 11/06; B60K 1/00; F16H 57/08
(52) U.S. Cl. ................ 280/250.1; 180/6.48; 180/65.6; 475/28; 475/34
(58) Field of Search .................... 180/90.7, 6.2, 180/6.48; 280/304.1, DIG. 6, 65.1, 65.6–65.8, 250.1; 475/28, 338, 339, 341, 1, 3; 318/139

(56) References Cited

U.S. PATENT DOCUMENTS

| | | | |
|---|---|---|---|
| 4,471,972 | * | 9/1984 | Young ................................ 280/250.1 |
| 5,186,269 | * | 2/1993 | Avakian et al. ..................... 180/65.6 |
| 5,242,179 | * | 9/1993 | Beddome et al. ................. 280/250.1 |
| 5,683,321 | * | 11/1997 | Barnett .............................. 280/250.1 |

FOREIGN PATENT DOCUMENTS

| | | |
|---|---|---|
| 60-159255 | 10/1985 | (JP) . |
| 7-136218 | 5/1995 | (JP) . |
| 8-117287 | 5/1996 | (JP) . |
| 9-038145 | 2/1997 | (JP) . |

* cited by examiner

*Primary Examiner*—Brian L. Johnson
*Assistant Examiner*—Matthew Luby
(74) *Attorney, Agent, or Firm*—Oblon, Spivak, McClelland, Maier & Neustadt, P.C.

(57) ABSTRACT

A first rotating axis and a second rotating axis are respectively connected to one of a sun gear, a ring gear, and a planetary gear carrier of a first planetary gear train and a second planetary gear train. One of the sun gear, ring gear, and planetary gear carrier of the first planetary gear train is fixed to a frame, and one of the other elements is synchronized in revolution. One corresponding sun gear, ring gear, and planetary gear carrier of the second planetary gear train is rotatably mounted. A rotation degree of the rotatably mounted sun gear, ring gear, and planetary gear carrier of the second planetary gear train is measured. Then, a phase difference with respect to rotations of the first rotating axis and the second rotating axis can be detected.

17 Claims, 17 Drawing Sheets

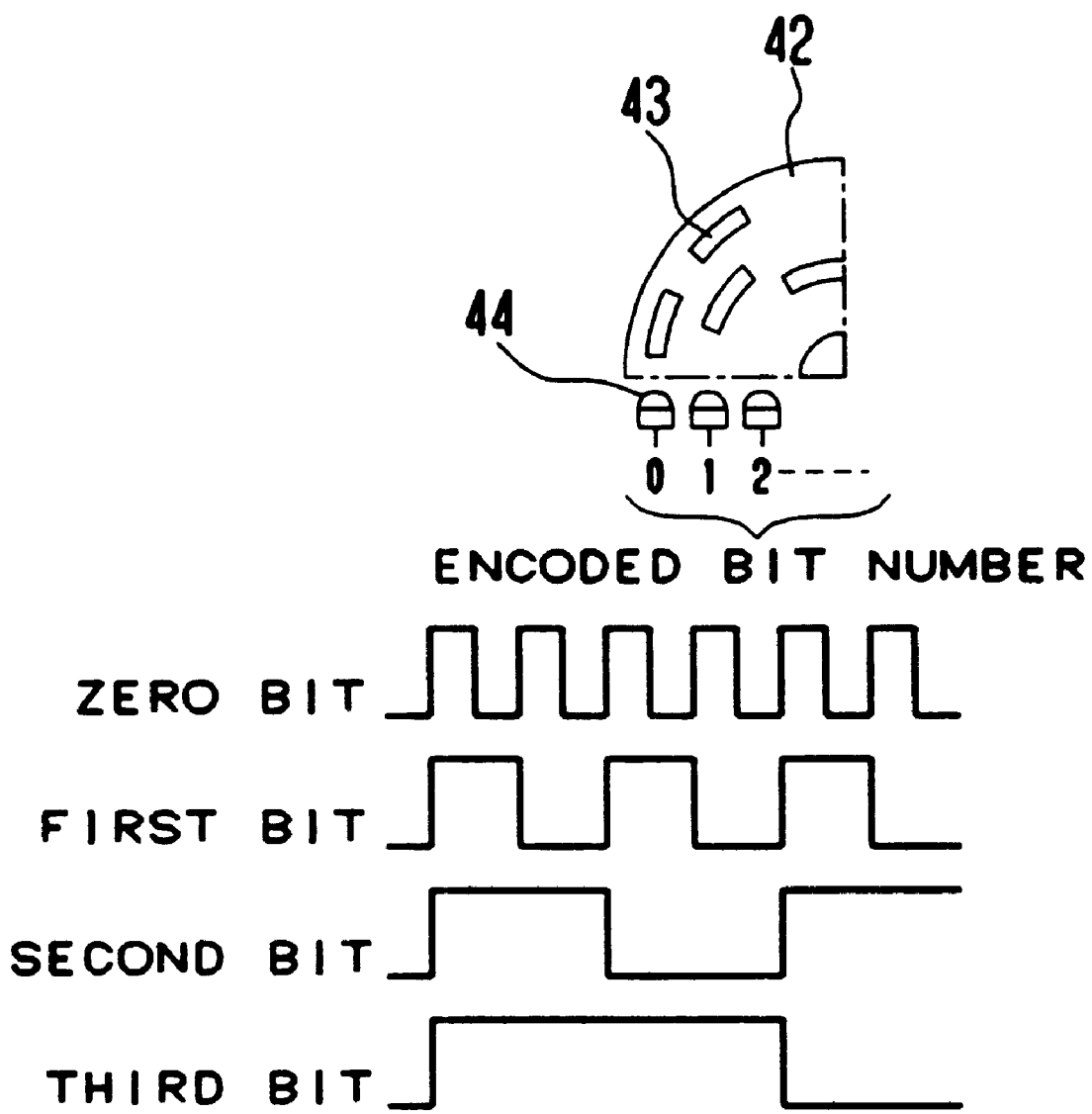

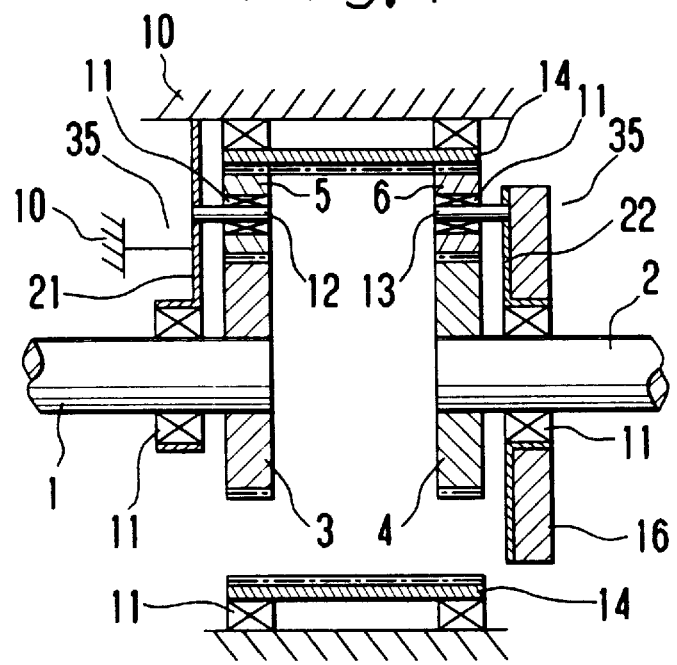
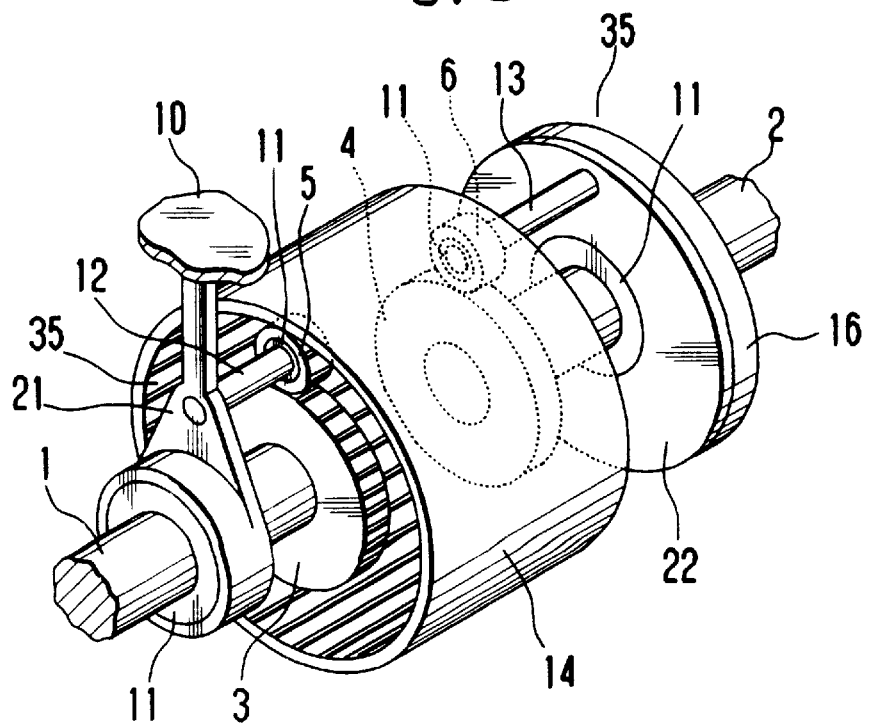

Fig. 15
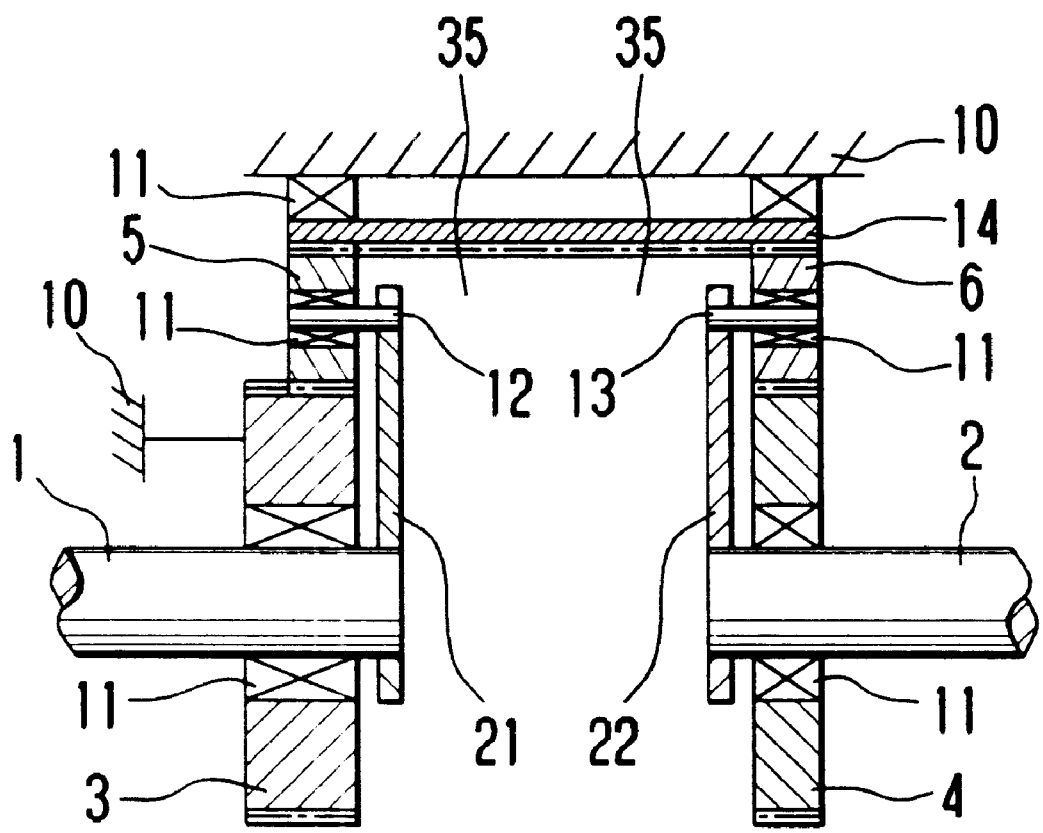
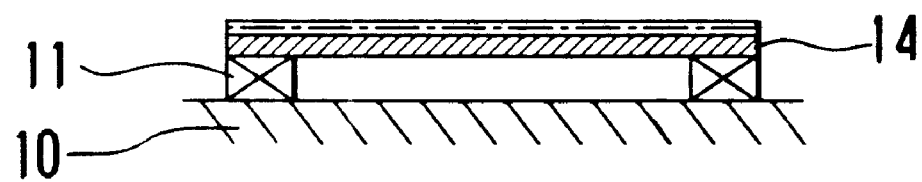

PHASE DIFFERENCE DETECTING APPARATUS AND WHEELCHAIR USING THE SAME

BACKGROUND OF THE INVENTION

1. Field of the Invention

The present invention relates to a phase difference detecting apparatus for detecting phase difference with respect to rotations of two rotating axes, which rotate individually. The present invention also relates to a wheelchair using the phase difference detecting apparatus.

2. Discussion of the Background

Several methods for detecting phase differences with respect to rotations of two axes are known. A rotary encoder introduced in "A sensor applied techniques in hundred instances", pages 181–182, Akira Usami, Institute of Industrial Research, is now described. FIGS. 1(A) and (B) show a structure and circuit of an optical rotary encoder. Several holes 43 are provided at a disk 42 attached at one end of a rotating axis 41, with a certain arrangement. Beams from an LED (light emitting diode) light source 44 pass through the holes 43 when the holes 43 reach the LED light source 44. The beam passed through the holes 43 irradiates a phototransistor 45, so that the beam is detected as a voltage signal.

An increment type and an absolute type rotary encoder exist. FIG. 2 shows waveforms of the absolute type rotary encoder. As shown in FIG. 2, in the absolute type rotary encoder a whole circle of the disk 42 is binary coded, so that a detected code by the phototransistor 45 corresponds one-to-one to a rotation degree of the disk 42.

In order to obtain a phase difference with respect to rotations of two axes, two rotary encoders can be provided as shown in FIGS. 1(A) and (B). Each rotation of the two rotating axes 41 is detected, and then a difference between the detected rotations is computed.

Japanese Patent Laid-Open No. Hei 7-136218 discloses an example of an apparatus having two wheels at right and left sides thereof, i.e. a wheelchair, and to which the above-identified rotation detecting device can be applied. The wheelchair controls the wheels using the measuring result obtained by measuring rotations of the right and left side wheels. The wheelchair can be used as an only one arm drive wheelchair using electric power. Japanese Patent Laid-Open No. Hei 7-136218 describes an arm drive wheelchair having an assistance driving force generating apparatus that supplies an assistance driving force to at least one wheel, in which the rotation of the arm driven wheel is detected, and an assistance driving force corresponding to the detected result is supplied to the other wheel. In the embodiment of Japanese Patent Laid-Open No. Hei 7-136218, as shown in FIG. 3, an assistance driving force generating apparatus M is provided on the left wheel 104L side. Rotation detecting means 177L, 177R are also provided for detecting rotating speeds of the wheels 104L, 104R or displacement of the wheels 104L, 104R. Then, the rotation speed of the right wheel 104R is detected by the rotation detecting means 177R, and an assistance driving force is supplied to the left wheel 104L by the assistance driving force generating apparatus M so that the left wheel 104L can catch up with the right wheel 104R.

Referring now to FIG. 4, a speed control of the left wheel 104L is described. A motor 126 controlled by motor control means 176 generates an assistance driving force FAL, and the left wheel 104L is driven with a certain speed NL (angular velocity ($\omega$L). The angular velocity $\omega$L of the left wheel 104L is detected by the rotation detecting means 177L and feedback control is executed according to the detected result. That is, the angular velocity $\omega$L of the left wheel 104L is compared with an angular velocity $\omega$R of the right wheel 104R. Then, the rotating speed NL of the motor 126 of the assistance drive force generating apparatus M is controlled as $$\text{deviation} \Delta\omega = |\omega L - \omega R| = 0.$$

The deviation $\Delta\omega$ means deviation of the angular velocity $\omega$L of the left wheel 104L to the angular velocity $\omega$R of the right wheel 104R. Thus, the rotating speed NL of the left wheel 104L can be equivalent to the rotating speed NR of the right wheel 104R.

Thus, Japanese Patent Laid-Open No. Hei 7-136218 merely discloses a technique for measuring each rotating speed of the right axis and the left axis and controlling the one axis. Japanese Patent Laid-Open No. Hei 7-136218 does not disclose detection of any phase difference.

A technique controlling a rotating speed of two axes by using a detected result of the rotating speed of two axes detected by a rotation detecting means such as a rotary encoder, and an example using such a technique as in Japanese Patent Laid-Open No. Hei 7-136218, have discussed above. Hereinafter, disadvantages of such a technique recognized by the present inventors are described.

First of all, with such a technique it is necessary to provide at least two rotation detecting means, one for each wheel. Accordingly, the size of the apparatus, the weight of the apparatus, and the costs of manufacture are all increased.

Secondly, it is impossible to detect speed over a wide range regardless of a kind of sensor. For instance, when a generator type sensor is used, the sensor is not able to detect speed over a wide range. A sensor output in a low-speed range is especially low. A pulse generator type sensor also has disadvantages with respect to the pulse interval. That is, it is difficult to narrow the interval of the pulse. A function generator type sensor has also the same disadvantages as the generator type sensor.

Taking account of the above-identified disadvantages, sensitivity in a low-speed range can be improved by using speed-up gears between the rotating axes and the sensor. However, when speed-up gears are used, the voltage or frequency in a high-speed range may become too high. Thus, the detecting speed range can not be widely improved by this solution. On the other hand, sensitivity in the high-speed range can be improved by using reduction gears between the rotating axes and the sensor. However, when reduction gears are used, the voltage or frequency in the low-speed range may become too low. Thus, the detecting speed range can not be widely improved by this solution. Further, a plurality of sensors responding to different speed ranges can be provided in order to detect an object that is changing speeds over a wide range. In this case, however, the apparatus becomes large-scale and complicated.

SUMMARY OF THE INVENTION

Accordingly, an object of the present invention is to novelly detect phase difference with respect to rotations of two rotating axes with one detecting mechanism.

Another object of the present invention is to novelly detect the phase difference over a wide speed range with respect to rotations of two rotating axes.

A further object of the present invention is to have a compact structure.

A further object of the present invention is to have a simple structure.

A further object of the present invention is to decrease a device weight.

A further object of the present invention is to decrease manufacturing costs.

These and further objects of the present invention are achieved by the novel phase detecting apparatus of the present invention, which can be applied to a wheelchair, although the novel phase difference detecting apparatus can be applied to other devices.

According to the novel phase difference detecting apparatus of the present invention, a frame and first and second planetary gear trains are provided and are respectively connected to first and second rotating axes. Each of the first and second planetary gear trains includes a sun gear, a ring gear, and a first planetary gear carrier. In the present invention at least one of such elements of one of the first and second planetary gear trains is connected to the frame, and the other corresponding element in the other planetary gear train is rotatably mounted. The other elements in the first planetary gear train can be synchronized with corresponding elements in the second planetary gear train. A phase difference can thereby be detected with respect to rotations of the first and second rotating axes by measuring a rotation degree of the at least one of the sun gear, ring gear, and planetary gear carrier that is rotatably mounted relative to the correspondingly element fixedly mounted to the frame.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, in which:

FIG. 2 is a time chart showing signal waveforms of the rotary encoder of FIG. 1(A);.

FIG. 7 is a longitudinal section view showing an apparatus of the second embodiment of the present invention;

FIG. 8 is a partially sectional perspective view of the apparatus of FIG. 7;

FIG. 15 is a longitudinal section view showing an apparatus of the sixth embodiment of the present invention;

DETAILED DESCRIPTION OF THE PREFERRED EMBODIMENTS

Figure 1A:
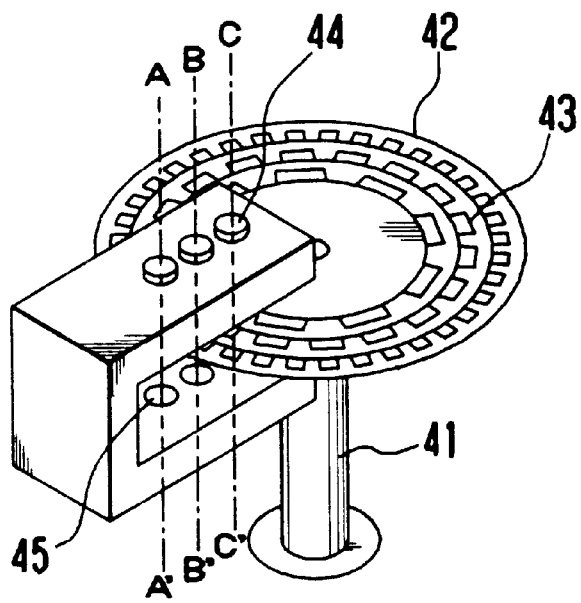
FIG. 1(A) is a perspective view showing a background rotary encoder.
Figure 1B:
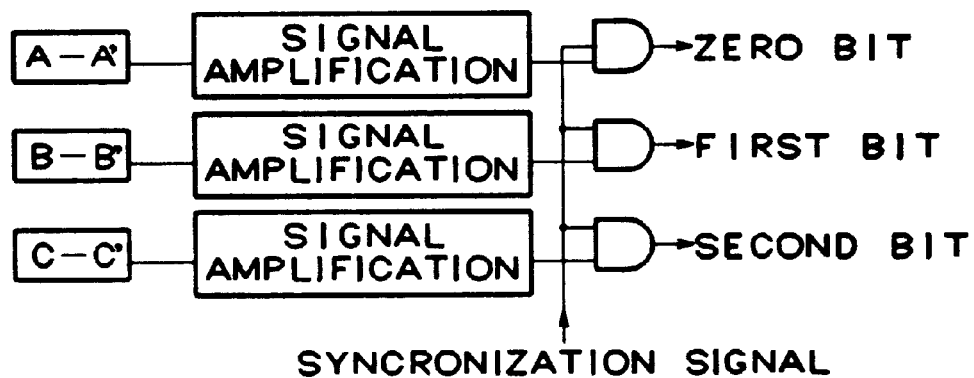
FIG. 1(B) is a block diagram of a signal system of the rotary encoder of FIG. 1(A);.
Figure 3:
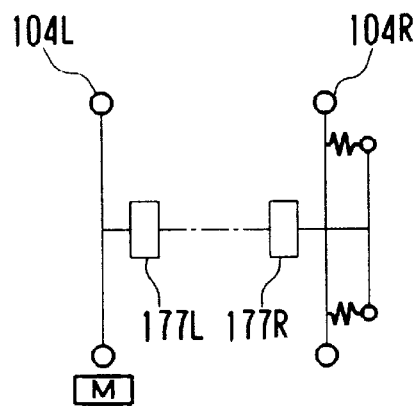
FIG. 3 is a chart showing an apparatus applying a rotation detecting device to a wheelchair.
Figure 4:
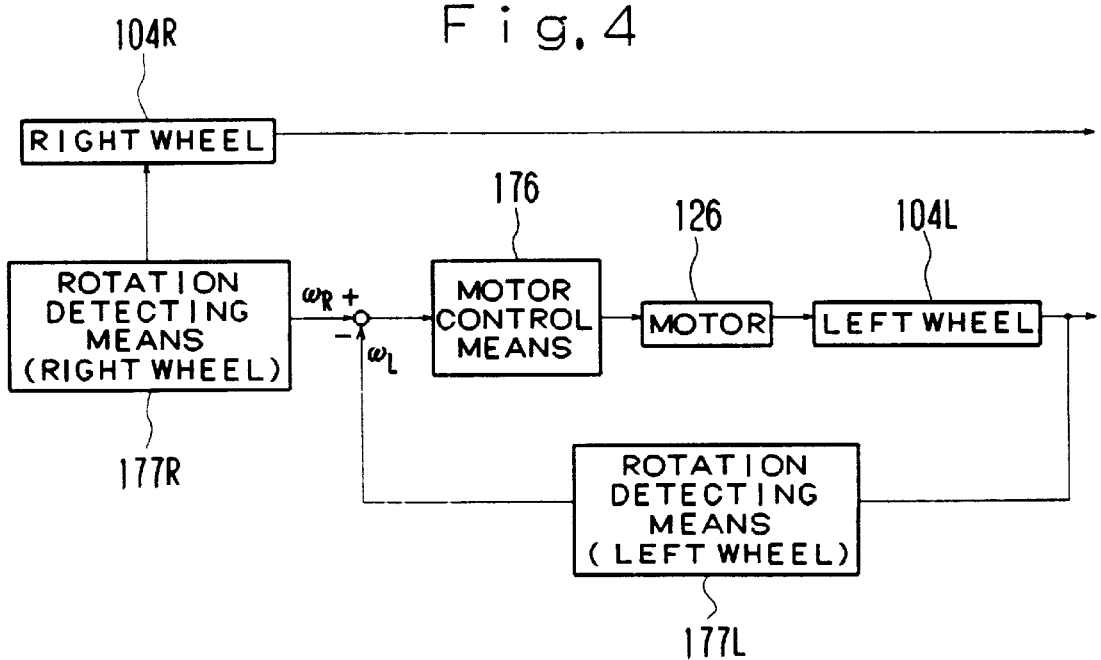
FIG. 4 is a block diagram of a speed control circuit.
Figure 5:
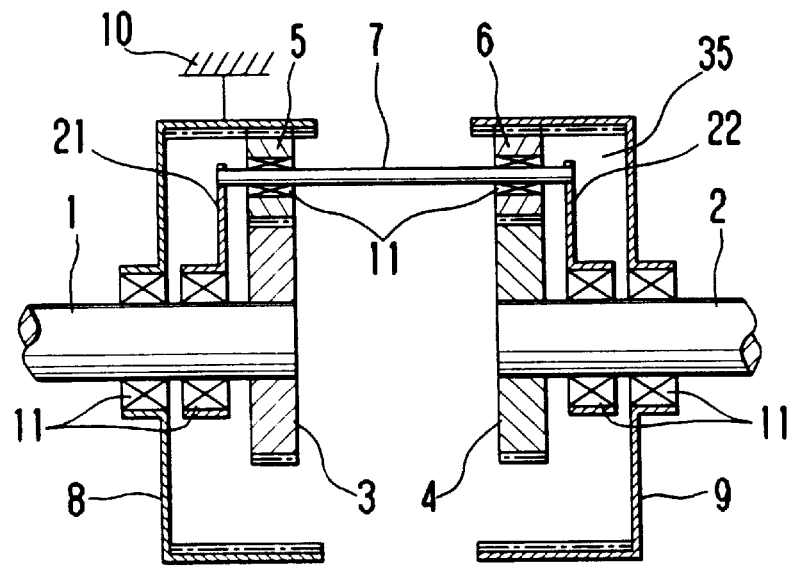
FIG. 5 is a longitudinal section view showing an apparatus of the first embodiment of the present invention.
Figure 6:
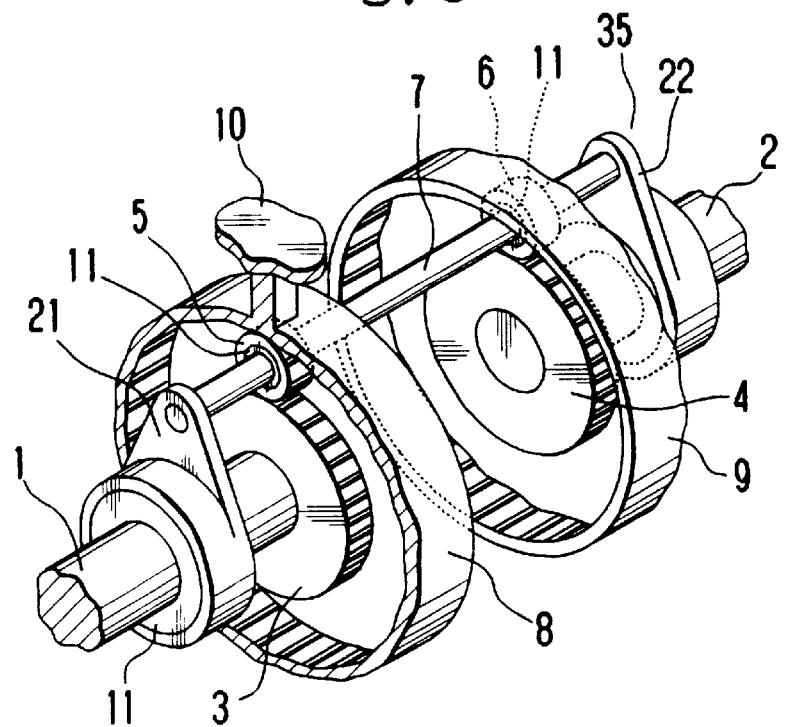
FIG. 6 is a partially sectional perspective view of the apparatus of FIG. 5.

A first embodiment according to the present invention is now explained with reference to FIGS. 5 and 6. The device of the first embodiment of the present invention includes a first rotating axis 1 and a second rotating axis 2 on a same axis. A pair of sun gears 3, 4 having the same diameter are respectively fixed to the first rotating axis 1 and the second rotating axis 2. A pair of planetary gears 5, 6 having the same diameter are respectively meshed to the sun gears 3, 4 to revolve with the sun gears 3, 4. The planetary gears 5, 6 are supported by a pair of planetary gear carriers 35. The planetary gear carriers 35 include a pair of revolving plates 21, 22 and a revolving axis 7. The revolving plates 21, 22 are rotatably supported on the first axis 1 and the second axis 2 by a pair of bearings 11. The revolving axis 7 connects the revolving plates 21, 22 and rotatably supports the planetary gears 5, 6. A pair of ring gears 8, 9 are also provided. The planetary gears 5, 6 are meshed to the ring gears 8, 9 at the inner circumferences of the ring gears 8, 9. The ring gears 8, 9 are supported on the first axis 1 and the second axis 2 by the bearings 11. One ring gear 8 is fixed to a frame 10. The other ring gear 9 is rotatably mounted. Spur gears can be are used for all gears 3,4,5,6,8 and 9.

In operation, the first rotating axis 1 and the second rotating axis 2 are driven by a driving source (not shown) and rotate individually. Then, each sun gear 3, 4 rotates according to rotations of the first rotating axis 1 and the second rotating axis 2. When the sun gear 3 connected to the first rotating axis 1 rotates, the planetary gear 5 meshed with the sun gear 3 revolves around the sun gear 3 with rotation thereof, since the ring gear 8 is fixed to the frame 10. The revolution of the planetary gear 5 is transmitted to the planetary gear 6 via the revolving axis 7.

When a phase difference with respect to the rotations of the first rotating axis 1 and the second rotating axis 2 occurs, the phase difference generates different rotating speeds between the planetary gear 5 and the planetary gear 6, so that the ring gear 9 connected to the second rotating axis 2 by the sun gear 4 will rotate. Accordingly, the amount of the phase difference with respect to the rotations of the first rotating axis 1 and the second rotating axis 2 can be obtained by measuring the rotation degree of the ring gear 9. The rotating degree of the ring gear 9 identifies the rotated degree of the ring gear 9 from the stationary condition thereof. If the phase difference with respect to the rotations of the first rotating axis 1 and the second rotating axis 2 is zero, that is, there is no phase difference, the ring gear 9 will be stationary. The amount of the phase difference with respect to the rotations of the first rotating axis 1 and the second rotating axis 2 can be calculated using the number of gear teeth with respect to the sun gears 3, 4 and the ring gears 8, 9.

That is, assume the number of gear teeth of the sun gears 3, 4 is "c"; the number of gear teeth of the ring gears 8, 9 is "a"; and the rotation degree of the ring gear 9 is θ (deg.). Then, the amount of the phase difference with respect to the rotations of the first rotating axis 1 and the second rotating axis 2 is given as (deg.)=θ·(a/c).

In the first embodiment, the ring gear 8 connected to the first rotating axis 1 by the sun gear 3 is fixed to the frame 10. However, the ring gear 9 connected to the second rotating axis 2 by the sun gear 4 may instead be fixed to the frame 10.

A second embodiment according to the present invention is now explained with reference to FIGS. 7 and 8. The same parts as those in the first embodiment are designated by the same reference numerals, and are not again explained herein. This second embodiment also relates to a mechanism that detects phase difference with respect to rotations of two axes using planetary gear trains, as in the first embodiment.

This second embodiment includes a first rotating axis 1 and a second rotating axis 2 on the same axis. A pair of sun gears 3, 4 having the same diameter are respectively fixed to the first rotating axis 1 and the second rotating axis 2. A pair of planetary gears 5, 6 having the same diameter are respectively meshed to the sun gears 3, 4 to revolve with the sun gears 3, 4. The planetary gears 5, 6 are supported by a pair of planetary gear carriers 35. The planetary gear carriers 35 include a pair of revolving plates 21, 22 and a pair of revolving axes 12, 13. The revolving plates 21, 22 are rotatably supported on the first axis 1 and the second axis 2 by a pair of bearings 11. The revolving axes 12, 13 rotatably support the planetary gears 5, 6. A ring gear 14 is also provided. The planetary gears 5, 6 are meshed to the ring gear 14 at the inner circumferences of the ring gear 14. The ring gear 14 is supported on the frame 10 by the bearings 11. The ring gear 14 is used as the ring gear for both planetary gear trains. That is, the ring gear 14 can be recognized as a unified ring gear of two planetary gear trains. Further, the revolving plate 21 connected to the first rotation axis 1 is fixed to the frame 10. The revolving plate 22 connected to the second rotation axis 2 is rotatably mounted. Spur gears can be used for all gears 3, 4, 5, 6 and 14.

In operation, the first rotating axis 1 and the second rotating axis 2 are driven by a driving source (not shown) and rotate individually. Then, each sun gear 3, 4 rotates according to rotations of the first rotating axis 1 and the second rotating axis 2. The planetary gear 5 connected to the first rotating axis 1 by the sun gear 3 dose not rotate, since the revolving plate 21 connected to the planetary gear 5 by the revolving axis 12 is fixed to the frame 10. Thus, the planetary gear 5 rotates according to the rotation of the sun gear 3, and then, the ring gear 14 rotates. The ring gear 14 transmits the rotation to the planetary gear 6 connected to the second rotating axis 2 by the sun gear 4.

Accordingly, when no phase difference between the first rotating axis 1 and the second rotating axis 2 occurs, the planetary gear 6 and the revolving axis 13 are stationary. When a phase difference between the first rotating axis 1 and the second rotating axis 2 does occur, the planetary gear 6 and the revolving axis 13 revolve around the sun gear 4 according to the phase difference between the first rotating axis 1 and the second rotating axis 2. Thus, the amount of the phase difference between the first rotating axis 1 and the second rotating axis 2 can be obtained by measuring the rotation degree of the revolving plate 22 that is rotated with revolution of the planetary gear 6 and the revolving axis 13 according to the phase difference between the first rotating axis 1 and the second rotating axis 2. In the present embodiment, as shown FIGS. 7 and 8, the revolving plate 22 includes a revolving disk 16 having a disk-like shape to detect the revolution of the planetary gear 6 and the revolving axis 13 easily. The revolving disk 16 may instead be rotatably provided on the first rotating axis 1 by the bearing 11, and the revolving plate 21 may connect to the revolving disk 16 to obtain the same results.

The amount of the phase difference with respect to the rotations of the first rotating axis 1 and the second rotating axis 2 can be calculated using the number of gear teeth with respect to the sun gears 3, 4 and the ring gear 14. That is, assume that the number of gear teeth of the sun gears 3, 4 is "c"; the number of gear teeth of the ring gear 14 is "a"; and the rotation degree of the ring gear 9 is θ (deg.). Then, the amount of the phase difference with respect to the rotations of the first rotating axis 1 and the second rotating axis 2 is given by (deg.)=θ·(a+c/c).

In the second embodiment, revolution of the revolving axis 12 of the planetary gear 5 is limited by fixing the revolving plate 21 to the frame 10. The revolution of the revolving axis 13 of the planetary gear 6 may instead be limited by fixing the revolving plate 22 to the frame 10.

Figure 9:
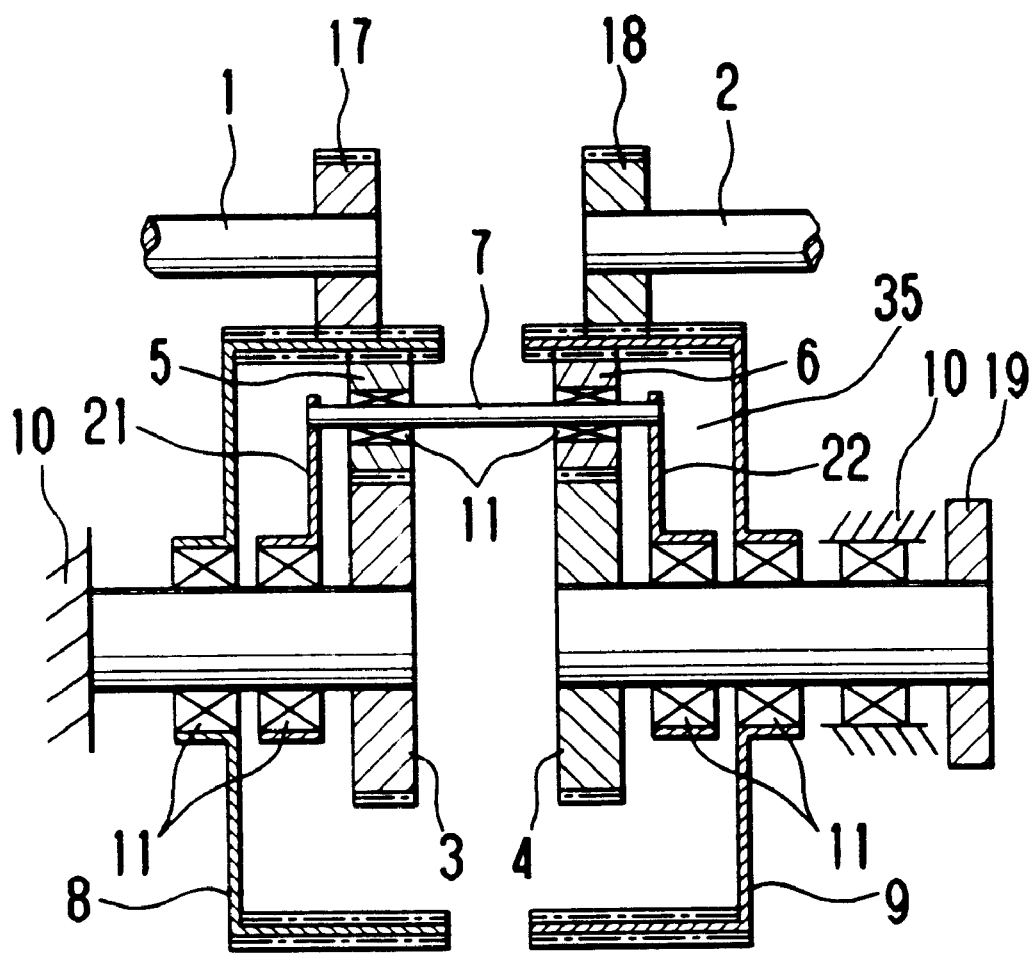
FIG. 9 is a longitudinal section view showing an apparatus of the third embodiment of the present invention.
Figure 10:
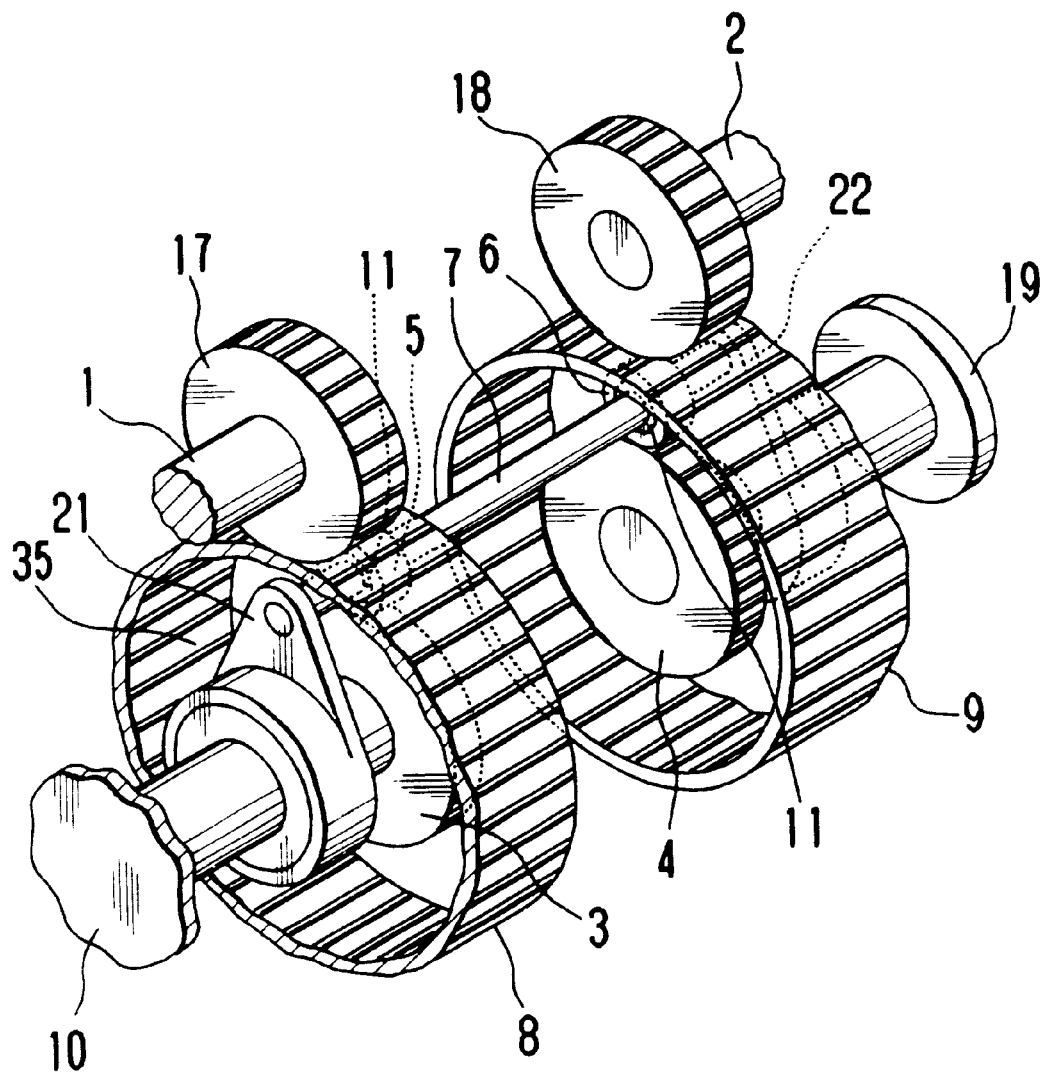
FIG. 10 is a partially sectional perspective view of the apparatus of FIG. 9.

A third embodiment according to the present invention is now explained with reference to FIGS. 9 and 10. The same parts as those in the first embodiment are designated by the same reference numerals, and are not again explained herein.

The third embodiment includes transmitting gears 17, 18 at each end of the respective first rotation axis 1 and the second rotation axis 2. The sun gear 3 is fixed to the frame 10. The sun gear 4 is rotatably supported on the frame 10. Thus, the sun gear 4 is rotatable with the frame 10. The pair of planetary gears 5, 6 having the same diameter are respectively meshed to the sun gears 3, 4 to revolve with the sun gears 3, 4. The planetary gears 5, 6 are supported by the pair of planetary gear carriers 35. The planetary gear carriers 35 include the pair of revolving plates 21, 22 and the revolving axis 7. The revolving plates 21, 22 are rotatably supported on the axis of the sun gear 3 by the bearings 11. The revolving axis 7 rotatably supports the planetary gears 5, 6. Ring gears 8, 9 are also provided. The planetary gears 5, 6 are respectively meshed to the ring gears 8, 9 at the inner circumferences of the ring gears 8, 9. The ring gears 8, 9 are rotatably supported on the axis of the sun gears 3, 4 by the bearings 11. Teeth are provided meshed with the transmitting gears 17, 18 on the outer circumferences of the ring gears 8, 9. The sun gear 3 is fixed to the frame 10, and the sun gear 4 is rotatable supported. A disk 19 is fixed at the end of the axis of the sun gear 4.

In operation, the first rotating axis 1 and the second rotating axis 2 are driven by a driving source (not shown) and rotate individually. When the first rotating axis 1 is rotated, the ring gear 8 also rotates. Then, the planetary gear 5 revolves and rotates between the ring gear 8 and the sun gear 3 since the sun gear 3 is fixed to the frame 10. The revolution of the planetary gear 5 is transmitted to the planetary gear 6 by the revolving axis 7.

Accordingly, when no phase difference between the first rotating axis 1 and the second rotating axis 2 occurs, the sun gear 4 is stationary. When a phase difference between the first rotating axis 1 and the second rotating axis 2 does occur, the sun gear 4 rotates according to the phase difference between the first rotating axis 1 and the second rotating axis 2. Thus, the amount of the phase difference between the first rotating axis 1 and the second rotating axis 2 can be obtained by measuring the rotation degree of the sun gear 4. The amount of the phase difference with respect to the rotations of the first rotating axis 1 and the second rotating axis 2 can be calculated using the number of gear teeth with respect to the sun gears 3, 4 and the ring gears 8, 9.

That is, assume that the number of gear teeth of the sun gears 3, 4 is "c"; the number of inner gear teeth of the ring gears 8, 9 is "a"; the number of outer gear teeth of the ring gears 8, 9 is "d"; the number of the transmitting gears 17, 18 is "e"; and the rotation degree of the ring gear 9 is θ (deg.). Then, the amount of phase difference with respect to the rotations of the first rotating axis 1 and the second rotating axis 2 is given by (deg.)=θ·(c/a)·(d/e).

In the third embodiment, the sun gear 3 is fixed to the frame 10. The sun gear 4 may instead be fixed to the frame 10.

Figure 11:
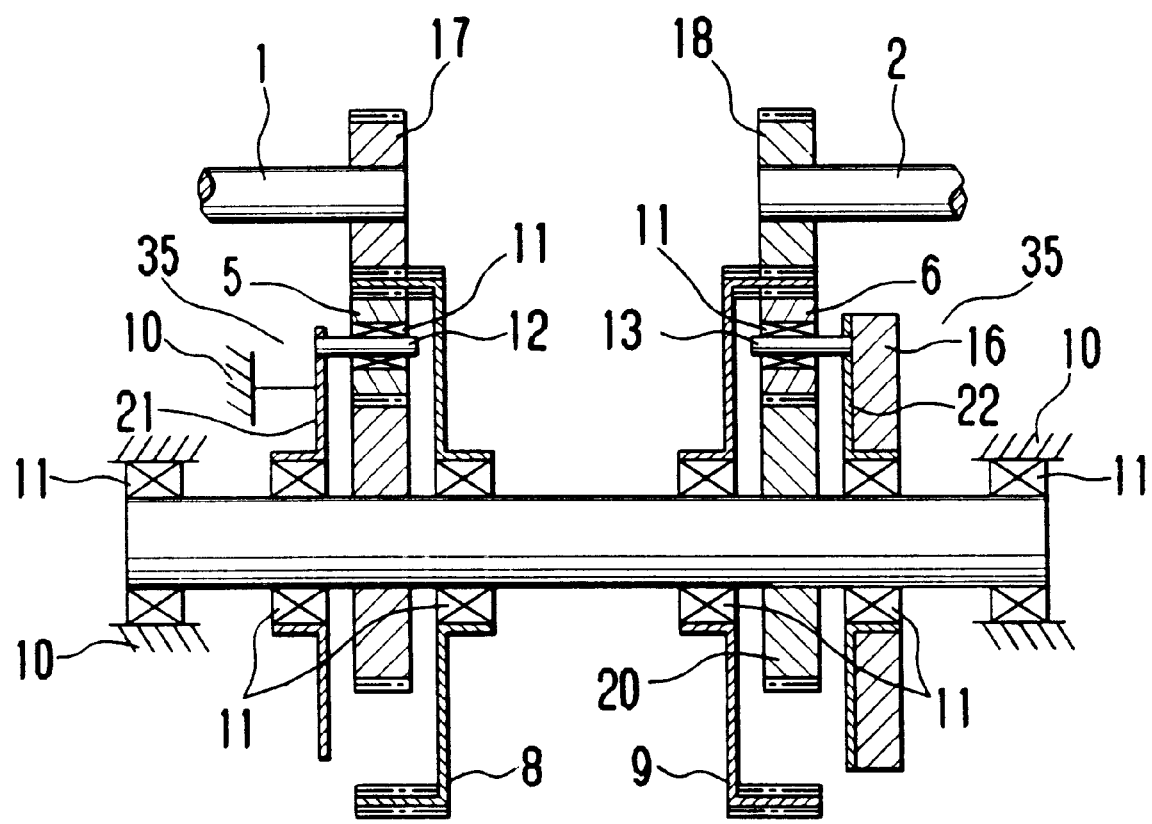
FIG. 11 is a longitudinal section view showing an apparatus of the fourth embodiment of the present invention.
Figure 12:
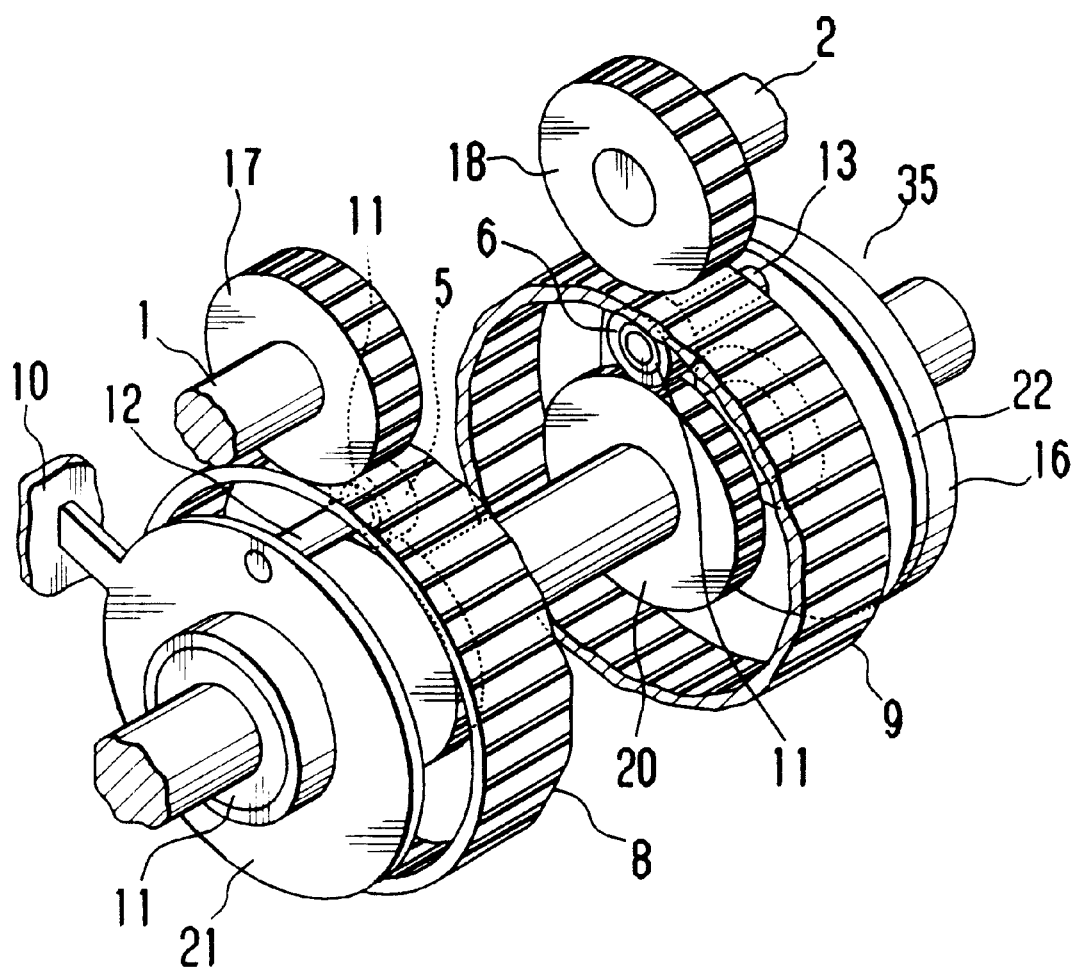
FIG. 12 is a partially sectional perspective view of the apparatus of FIG. 11.

A fourth embodiment according to the present invention is now explained with reference to FIGS. 11 and 12. The same parts as those in the first embodiment are designated by the same reference numerals, and are not again explained herein.

The fourth embodiment includes transmitting gears 17, 18 at each end of the first rotation axis 1 and the second rotation axis 2. The sun gear 20 is rotatably mounted on the frame 10 by the bearing 11. The sun gear 20 includes two gears, and an axis that connects the two gears. Thus, the sun gear 20 operates as the sun gear of two planetary gear trains. As shown in FIG. 11, the pair of planetary gears 5, 6 having the same diameter are meshed to the sun gear 20 to revolve with the sun gear 20. The planetary gears 5, 6 are supported by the pair of planetary gear carriers 35. In the present embodiment, the planetary gear carriers 35 respectively include the pair of revolving plates 21, 22 and the pair of revolving axes 12, 13. The revolving plates 21, 22 are rotatably supported on the axis of the sun gear 20 by the bearings 11. The revolving axes 12, 13 are fixed to the revolving plates 21, 22 and rotatably support the respective planetary gears 5, 6. The revolving plate 21 is fixed to the frame 10, and the revolving plate 22 is kept rotatable. Ring gears 8, 9 are rotatably provided on the axis of the sun gear 20 by the bearings 11. The planetary gears 5, 6 are respectively meshed to the ring gears 8, 9 at the inner circumferences of the ring gears 8, 9. Teeth are meshed with the transmitting gears 17, 18 on the outer circumferences of the ring gears 8, 9. Spur gears can be used for all gears.

In operation, the first rotating axis 1 and the second rotating axis 2 are driven by a driving source (not shown) and rotate individually. When the first rotating axis 1 and the second rotating axis 2 are rotated, the transmitting gears 17, 18 also rotate. Then, the planetary gear 5 transmits the rotation to the sun gear 20, since the revolving plate 21 of the planetary gear 5 is fixed to the frame 10. When no phase difference between the first rotating axis 1 and the second rotating axis 2 occurs, the planetary gear 6 does not revolve. When a phase difference between the first rotating axis 1 and the second rotating axis 2 does occur, the planetary gear 6 revolves according to the phase difference between the first rotating axis 1 and the second rotating axis 2. Thus, the amount of the phase difference between the first rotating axis 1 and the second rotating axis 2 can be obtained by measuring the revolving degree of the planetary gear 6. In the present embodiment, as shown FIG. 12, the revolving plate 22 of the planetary gear 6 includes a revolving disk 16 having a disk-like shape to detect the revolution of the planetary gear 6 and the revolving axis 13 easily.

The amount of the phase difference with respect to the rotations of the first rotating axis 1 and the second rotating axis 2 can be calculated using the number of gear teeth with respect to the sun gear 20 and the ring gears 8, 9. That is, assume the number of gear teeth of the sun gears 20 is "c"; the number of inner gear teeth of the ring gears 8, 9 is "a"; the number of outer gear teeth of the ring gears 8, 9 is "d"; the number of transmitting gears 17, 18 is "e", and the rotation degree of the ring gear 9 is θ (deg.). Then, the amount of the phase difference with respect to the rotations of the first rotating axis 1 and the second rotating axis 2 is given by (deg.)=θ·((a+c)/a)·(d/e).

In the fourth embodiment, the revolving plate 21 of the planetary gear 5 is fixed to the frame 10. The revolving plate 22 of the planetary gear 6 may instead be fixed to the frame 10.

Figure 13:
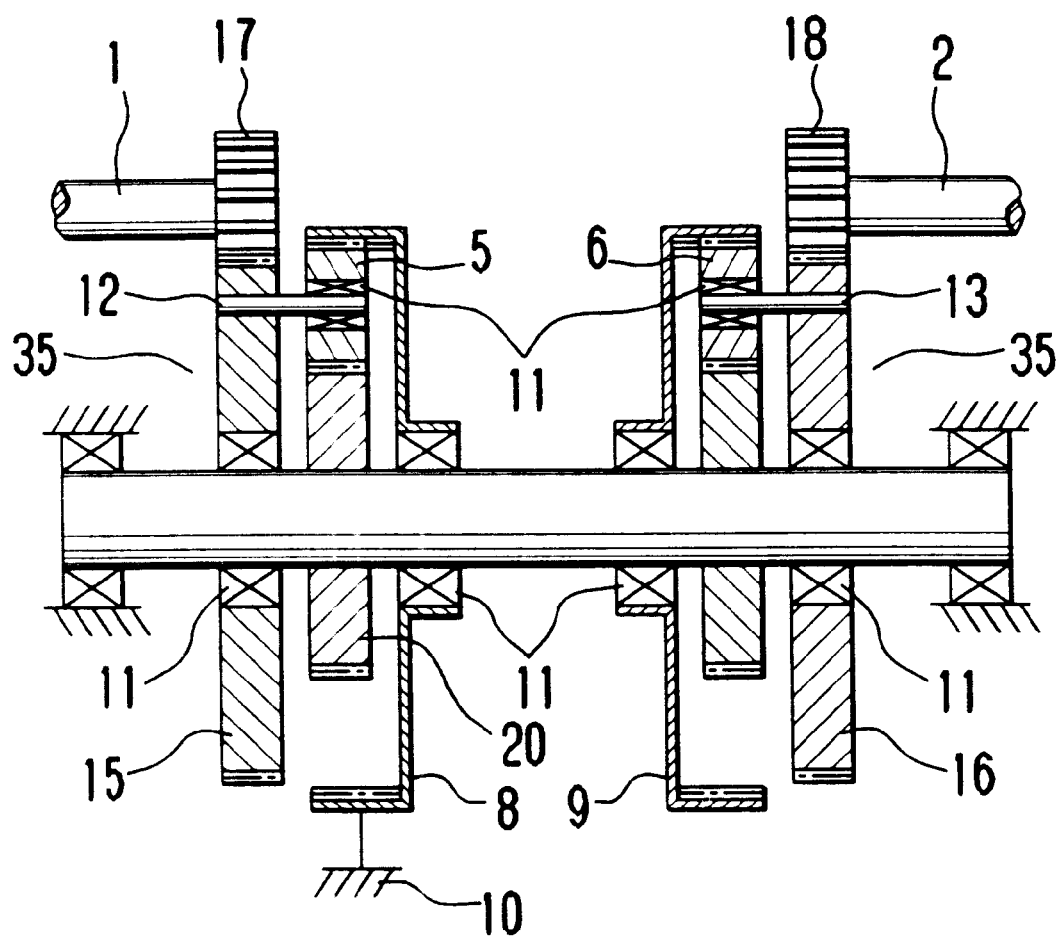
FIG. 13 is a longitudinal section view showing an apparatus of the fifth embodiment of the present invention.
Figure 14:
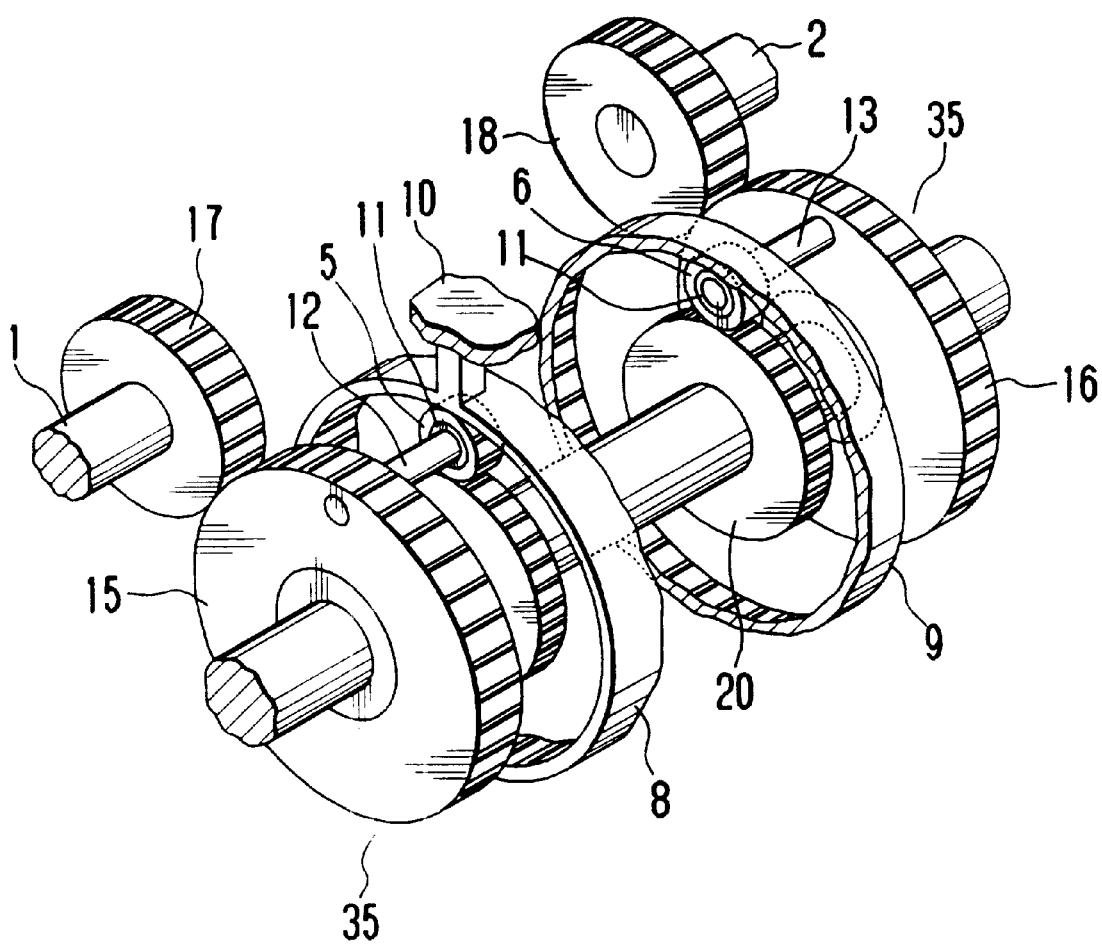
FIG. 14 is a partially sectional perspective view of the apparatus of FIG. 13.

A fifth embodiment according to the present invention is now explained with reference to FIGS. 13 and 14. The same parts as those in the first embodiment are designated by the same reference numerals, and are not again explained herein.

The fifth embodiment includes transmitting gears 17, 18 at each end of the first rotation axis 1 and the second rotation axis 2. The sun gear 20 is rotatably mounted on the frame 10 by the bearing 11. The sun gear 20 includes two gears, and an axis that connects the two gears. Thus, the sun gear 20 operates as the sun gear of two planetary gear trains. As shown in FIG. 13, the pair of planetary gears 5, 6 having the same diameter are meshed to the sun gear 20 to revolve with the sun gear 20. The planetary gears 5, 6 are supported by the pair of planetary gear carriers 35. In the present embodiment, the planetary gear carriers 35 include the pair of revolving plates 15, 16 and the pair of revolving axes 12, 13. The revolving plates 15, 16 are rotatably supported on the axis of the sun gear 20 by the bearings 11. The revolving axes 12, 13 are respectively fixed to the revolving plates 21, 22 and rotatably support the planetary gears 5, 6. Ring gears 8, 9 are rotatably provided on the axis of the sun gear 20 by the bearings 11. The planetary gears 5, 6 are respectively meshed to the ring gears 8, 9 at the inner circumferences of the ring gears 8, 9. Teeth are meshed with the transmitting gears 17, 18 on the outer circumferences of the revolving plates 15, 16. The ring gear 8 is fixed to the frame 10, and the ring gear 9 is kept rotatable. Spur gears can be used for all gears.

In operation, the first rotating axis 1 and the second rotating axis 2 are driven by a driving source (not shown) and rotate individually. When the first rotating axis 1 and the second rotating axis 2 are rotated, the revolving plates 15, 16 also rotate by the transmitting gears 17, 18. Then, the planetary gear 5 transmits the rotation to the sun gear 20, since the ring gear 8 is fixed to the frame 10. The sun gear 20 also transmits the rotation to the planetary gear 6.

When no phase difference between the first rotating axis 1 and the second rotating axis 2 occurs, the ring gear 9 does not rotate. When a phase difference between the first rotating axis 1 and the second rotating axis 2 does occur, the ring gear 9 rotates according to the phase difference between the first rotating axis 1 and the second rotating axis 2. Thus, the amount of the phase difference between the first rotating axis 1 and the second rotating axis 2 can be obtained by measuring the rotation degree of the ring gear 9. The amount of the phase difference with respect to the rotations of the first rotating axis 1 and the second rotating axis 2 can be calculated using the number of gear teeth with respect to the sun gears 20 and the ring gears 8, 9.

That is, assume the number of gear teeth of the sun gears 20 is "c"; the number of teeth of the ring gears 8, 9 is "a"; the number of teeth of the revolving plates 15, 16 is "f"; the number of the transmitting gears 17, 18 is "e"; and the rotation degree of the ring gear 9 is θ (deg.). Then, the amount of the phase difference with respect to the rotations of the first rotating axis 1 and the second rotating axis 2 is given by (deg.)=θ·(a/(a+c))·(f/e).

In the fifth embodiment, the ring gear 8 is fixed to the frame 10. The ring gear 9 may instead be fixed to the frame 10.

Figure 16:
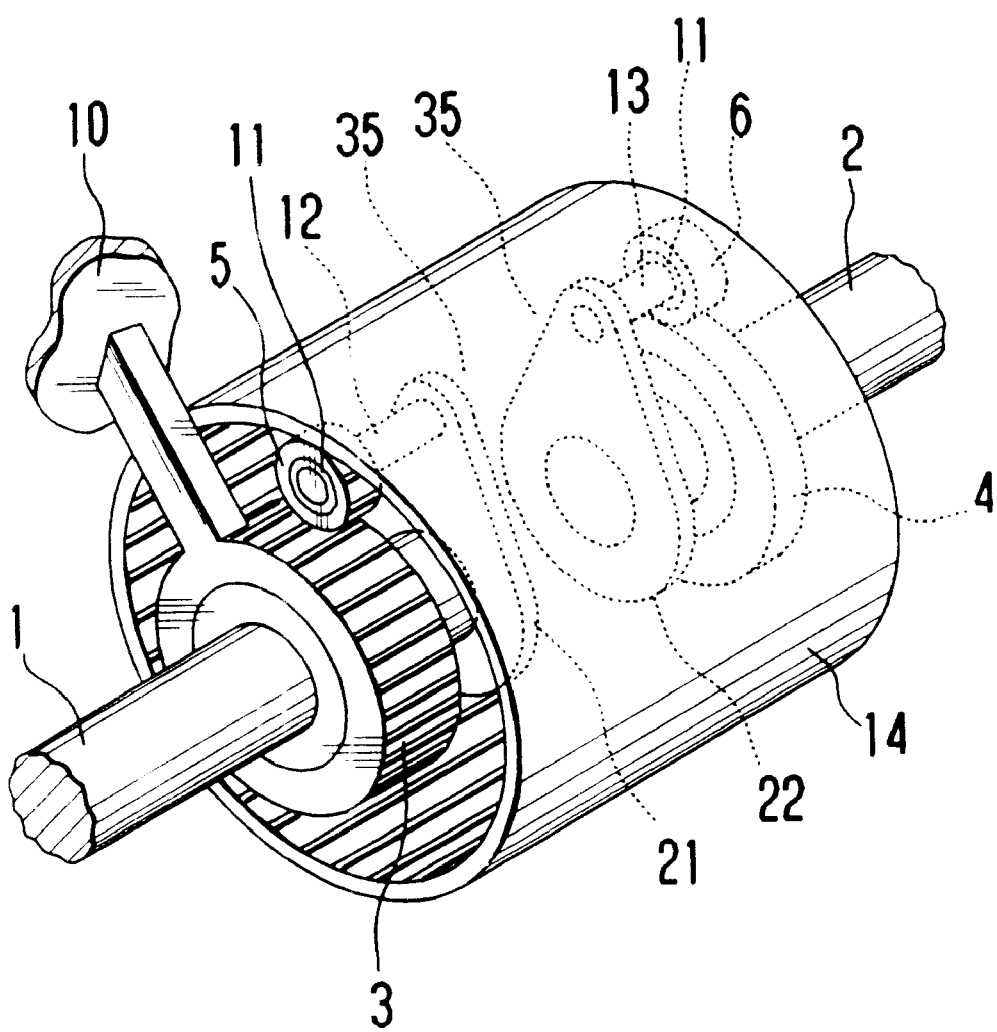
FIG. 16 is a partially sectional perspective view of the apparatus of FIG. 15.

A sixth embodiment according to the present invention is now explained with reference to FIGS. 15 and 16. The same parts as those in the first embodiment are designated by the same reference numerals, and are not again explained herein.

The pair of revolving plates 21, 22 are rotatably mounted on the first rotating axis 1 and the second rotating axis 2. The pair of revolving axes 12, 13 is fixed to the revolving plates 21, 22. The planetary gears 5, 6 are respectively rotatably mounted on the revolving axes 12, 13. In the present embodiment, the revolving plates 21, 22 and the revolving axes 12, 13 identify the planetary gear carriers 35. The sun gears 3, 4 respectively meshed with the planetary gears 5, 6 are rotatably mounted on the first rotating axis 1 and the second rotating axis 2 by the bearings 11. The sun gear 3 is fixed to the frame 10, and the sun gear 4 is kept rotatable. Ring gear 14 is provided meshed with the planetary gears 5, 6. The ring gear 14 operates as the ring gear of two planetary gear trains. The ring gear 14 is rotatably supported on the frame 10 by the bearing 11. A pair of revolving plates 21, 22 are provided which connect the first rotating axis 1 and the second rotating axis 2 to synchronize the revolutions of the planetary gears 5, 6. Spur gears can be used for all gears 3, 4, 5, 6 and 14.

In operation, the first rotating axis 1 and the second rotating axis 2 are driven by a driving source (not shown) and rotate individually. The ring gear 14 is urged to rotate by the revolutions and the rotations of the planetary gears 5, 6, since the sun gear 3 is fixed to the frame 10. The ring gear 14 is common to two planetary gear trains.

Accordingly, when no phase difference between the first rotating axis 1 and the second rotating axis 2 occurs, the sun gear 4 is stationary. When a phase difference between the first rotating axis 1 and the second rotating axis 2 does occur, the sun gear 4 rotates according to the phase difference between the first rotating axis 1 and the second rotating axis 2. Thus, the amount of the phase difference between the first rotating axis 1 and the second rotating axis 2 can be obtained by measuring the rotation degree of the sun gear 4. The amount of the phase difference with respect to the rotations of the first rotating axis 1 and the second rotating axis 2 can be calculated using the number of gear teeth with respect to the sun gears 3, 4 and the ring gear 14.

That is, assume the number of gear teeth of the sun gears 3, 4 is "c"; the number of gear teeth of the ring gear 14 is "a"; and the rotation degree of the ring gear 9 is θ (deg.). Then, the amount of the phase difference with respect to the rotations of the first rotating axis 1 and the second rotating axis 2 is given by (deg.)=θ·(c/(a+c)).

In the sixth embodiment, the sun gear 3 is fixed to the frame 10. The sun gear 4 may instead be fixed to the frame 10.

Table 1 below summarizes the foregoing embodiments. The phase differences described in Table 1 show formulations for obtaining actual phase differences of the rotations based on the rotation degrees θ or the revolution degrees θ of the parts generating the phase differences. The differences in the mechanisms between each embodiment classifies the generated phase difference into two types. One at least reduces the phase difference (first to fifth embodiment). Another type at least magnifies the phase difference (third to sixth embodiment). Accordingly, in a case a small amount of phase difference is generated, a phase difference detecting apparatus described in third to sixth embodiment may be used. Then, the phase difference is magnified, so that the detecting accuracy can be improved. In a case a large amount of phase difference is generated, a phase difference detecting apparatus described in the first to fifth embodiment may be used. Then, the phase difference is reduced, so that the control range can be reduced. Further, figures for calculating by a computer can be reduced, for instance.

TABLE 1

| | 1. | 2. | 3. | 4. | 5. |
|---|---|---|---|---|---|
| First Embodiment | Sun gear | Planetary gear revolution | Ring gear | θ·(a/c) | Reduction |
| Second Embodiment | Sun gear | Ring gear | Planetary gear revolution | θ·(a+c)/c | Reduction |
| Third Embodiment | Ring gear | Planetary gear revolution | Sun gear | θ·(c/a)·(d/e) | Magnification or reduction |
| Fourth Embodiment | Ring gear | Sun gear | Planetary gear revolution | θ·{(a+c)/a}·(d/e) | Magnification or reduction |
| Fifth Embodiment | Planetary gear revolution | Sun gear | Ring gear | θ·{a/(a+c)}·(f/e) | Magnification or reduction |
| Sixth Embodiment | Planetary gear revolution | Ring gear | Sun gear | θ·{c/(a+c)} | Magnification |

1. Which parts are connected with the rotating axis
2. Which part is connected with corresponding epicyclic mechanism
3. Where the phase difference generates
4. Phase difference
5. Generated degree magnification/reduction of actual phase difference.
a: Number of teeth of the ring gear
c: Number of teeth of the sun gear
d: Number of teeth of outer circumference of the ring gear
e: Number of teeth of the transmitting gear f: Number of teeth of the revolving plate
θ (deg.): Rotation degree of the part at which the phase difference is generated In a case that the first rotating axis 1 and the second rotating axis 2 are not provided at the same axis, the mechanism using the transmitting gears 17, 18, as in the third, fourth, and fifth embodiments provides a solution.

With respect to each foregoing described mechanism, the rotation or revolution degree generated at certain parts can be controlled over a wide range for easy detection. For instance, suppose that only a small amount of phase difference between the first rotating axis 1 and the second rotating axis 2 occurs. In the first embodiment, it is possible to magnify the rotation degree of the ring gear 9 by increasing the ratio (number of teeth of the sun gear)/(number of teeth of the ring gear). In contrast, suppose that only a large amount of the phase difference between the first rotating axis 1 and the second rotating axis 2 occurs. In the first embodiment, it is possible to reduce the rotation degree of the ring gear 9 by decreasing the ratio (number of teeth of the sun gear)/(number of teeth of the ring gear).

When a certain control is executed according to the phase difference between the first rotating axis 1 and the second rotating axis 2, it is necessary to convert the detected phase difference to an electric signal. For this conversion, the rotation degree according to the phase difference from a zero point of the phase difference may by converted to the electric signal. For instance, a Hall element, potentiometer, differential transformer, etc., can be used as the converting means. That is, any kind of element that can convert the change of angle to an electric signal can be used.

Figure 17:
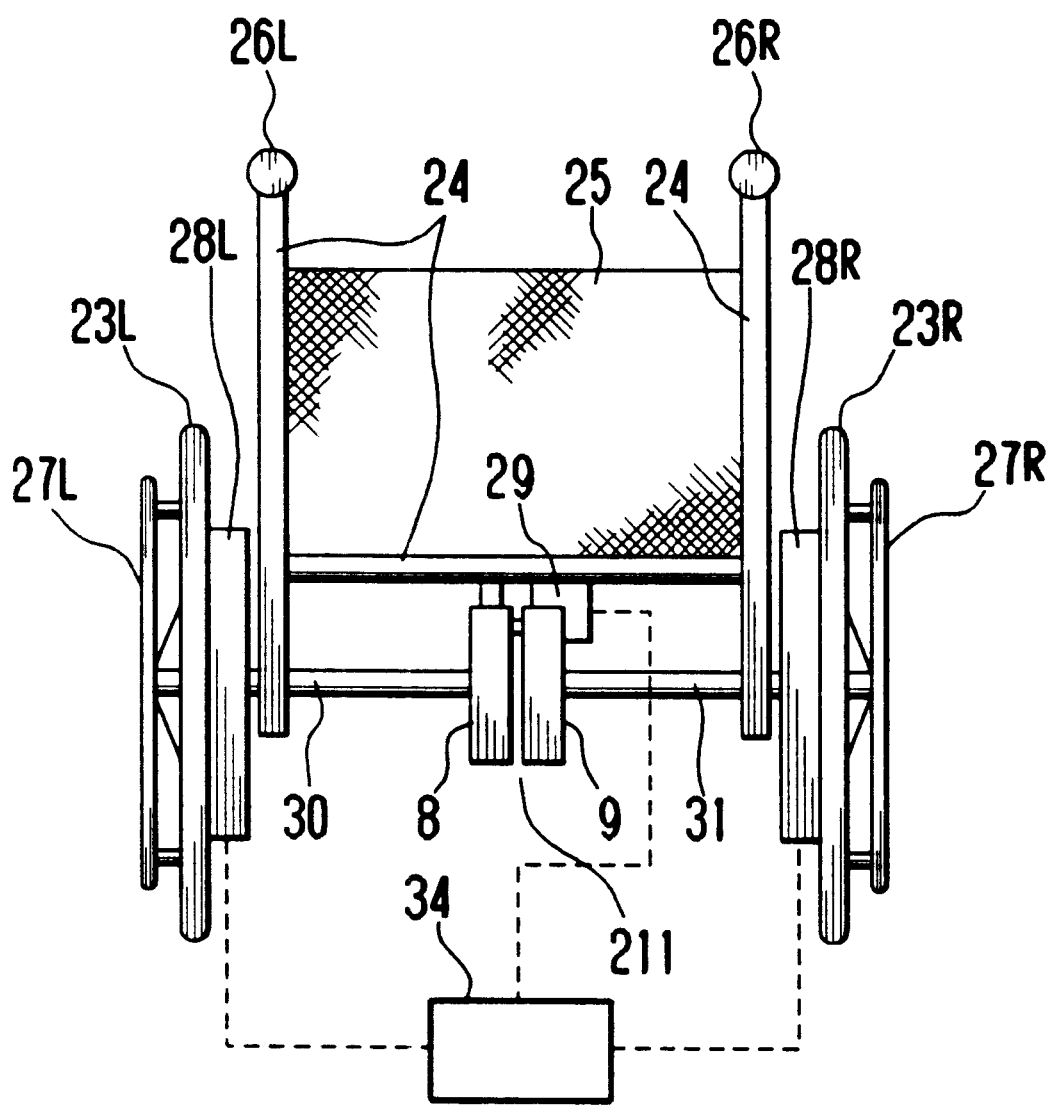
FIG. 17 is a rear view of a wheelchair using any of the apparatuses of FIGS. 5–16.

Hereinafter, one embodiment of a wheelchair having the above-mentioned phase difference detecting apparatus will be explained with reference to FIGS. 17 to 20. FIG. 17 shows a rear view of the wheelchair. The wheelchair includes a frame 24, a pair of wheels 23L, 23R rotatably attached to the frame 24, a seat 25 mounted in the frame 24, and a pair of handles 26L, 26R provided in the frame 24. A pair of hand rims 27L, 27R and a pair of rotation assistance means 28L, 28R in the wheels 23L, 23R are also provided. The rotation assistance means 28L, 28R have a structure for assisting the drive of the wheels 23L, 23R using driving power such as from a motor (not shown). For instance, the rotation assistance means 28L, 28R are the same structure as disclosed in Japanese Patent Laid-open No. Hei 9-38145 or Japanese Patent Laid-Open No. Hei 8-117287.

In this example the phase difference detecting apparatus 211 used in the wheelchair is the one explained in the first embodiment of the present invention, although of course any of the other embodiments could be employed. A left wheel axis 30 identifies the first rotating axis 1, a right wheel axis 31 identifies the second rotating axis 2, and these axes 30, 31 are connected to the phase difference detecting apparatus 211. The phase difference detecting apparatus 211 has two ring gears 8, 9. The ring gear 8 is fixed to the frame 24, the ring gear 9 is rotatably supported. The ring gear 9 is connected to the control means 34 by a ring gear rotation degree detecting apparatus 29. The control means 34 is also connected to the rotation assistance means 28L, 28R.

Figure 18:
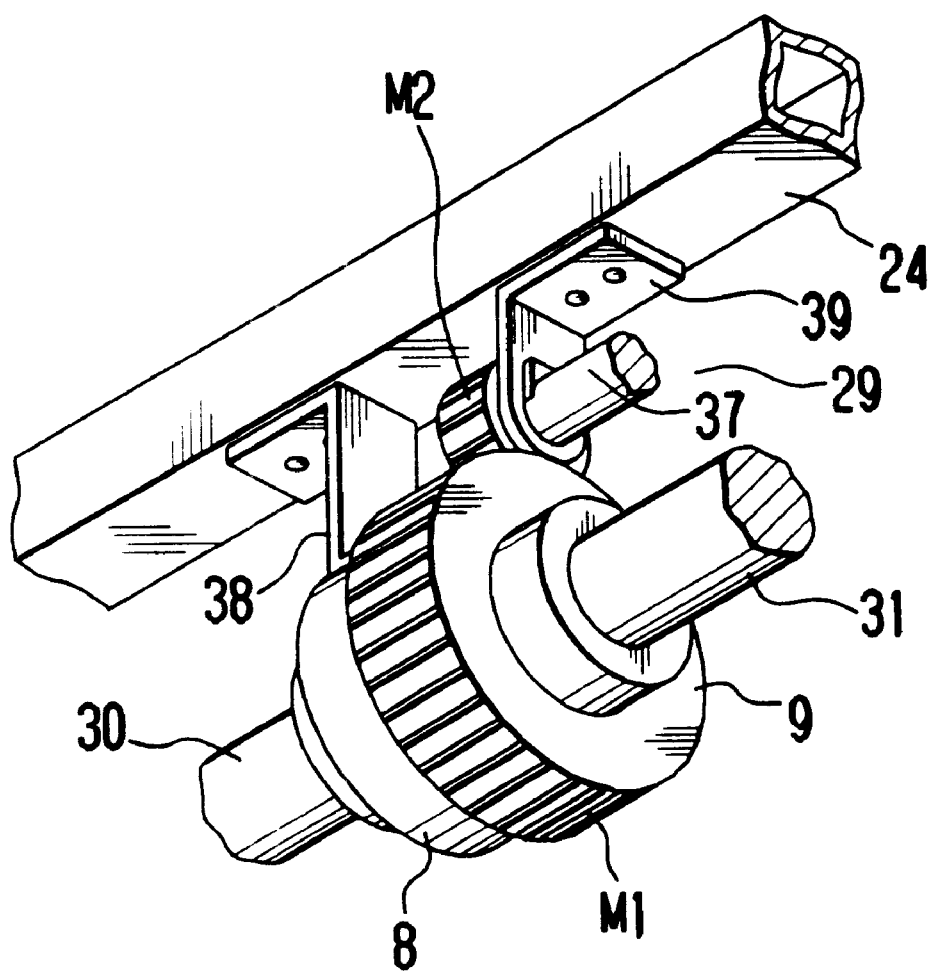
FIG. 18 is a perspective view showing a mechanism for transmitting data of rotation degree of an ring gear to a potentiometer.

FIG. 18 shows a structure of the ring gear rotation degree detecting apparatus 29. The ring gear rotation degree detecting apparatus 29 can convert the rotation degree of the ring gear 9 to an electric signal by using a potentiometer 37. As shown in FIG. 18, the ring gear 8 is fixed to the frame 24 by an anchor frame 38. A gear M1 is formed in the outer circumference of the ring gear 9. The potentiometer 37 is fixed to the frame 24 by an anchor frame 39. A gear M2 is meshed with the gear M1 of the ring gear 9 to a rotating axis of the potentiometer 37. Accordingly, the rotation of the ring gear 9 can be detected by using the potentiometer 37.

Figure 19:
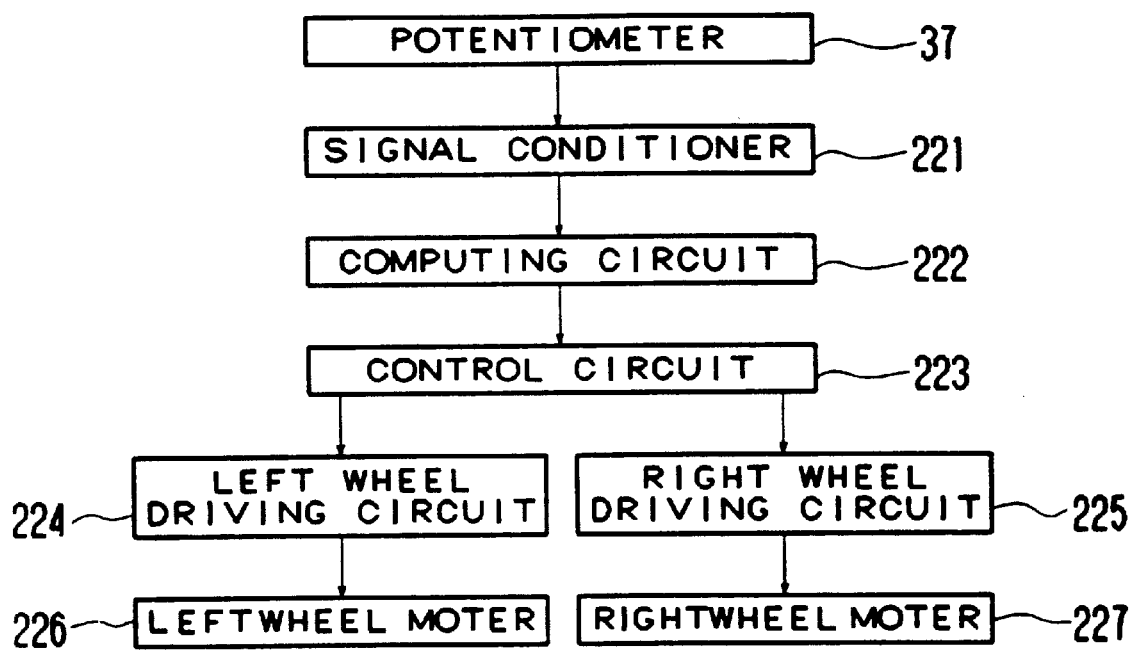
FIG. 19 is a block diagram of a control system.
Figure 20:
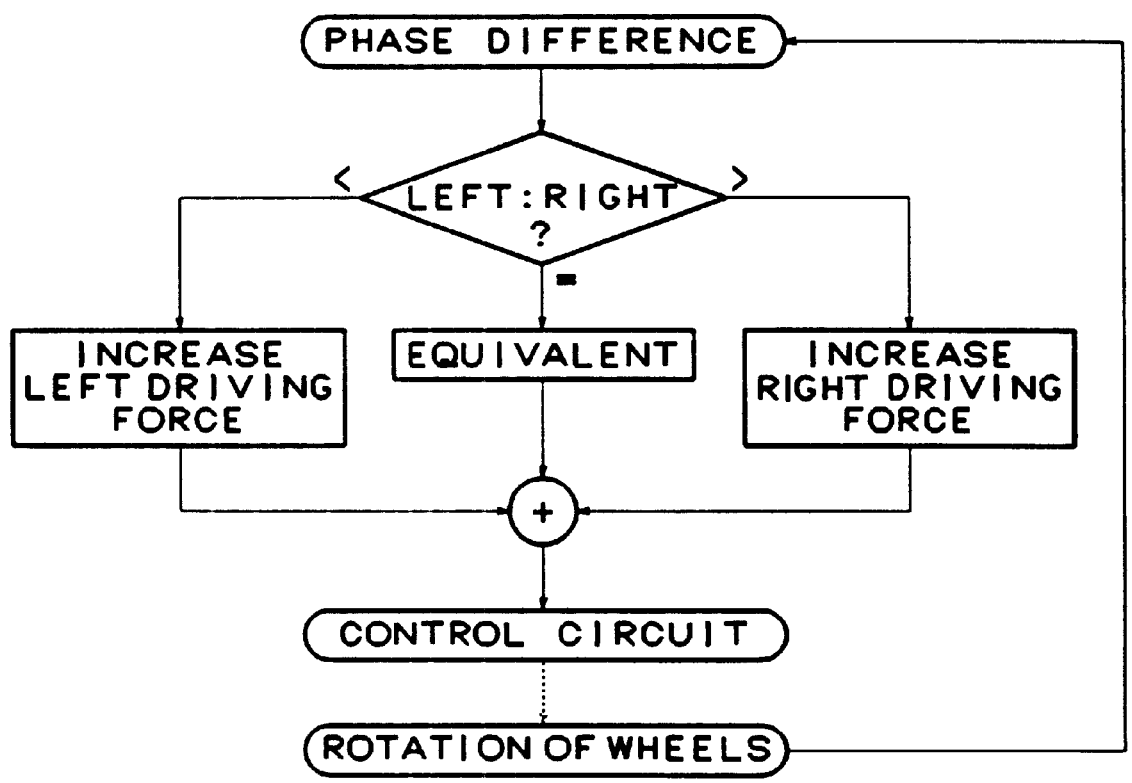
FIG. 20 is a flow chart showing a computing process.

Driving control of the wheelchair is now explained with reference to FIGS. 19 and 20. FIG. 19 is a block diagram of a control system. FIG. 20 is a flow chart showing a computing process. The potentiometer 37 outputs a resistance value according to the rotation degree, which is conditioned in signal conditioner 221, and which is then converted to phase difference data that can be processed by a processing unit (computing circuit) 222. The computing circuit 222 obtains distribution of the driving power for the left and right wheels 23L, 23R by calculations based on the converted phases difference data, according to logic shown in FIG. 20. The calculating result is input to the control circuit 223 as shown in FIG. 19, and then control data to a left wheel driving circuit 224 and a right wheel driving circuit 225 is generated. Then, the left wheel driving circuit 224 and the right wheel driving circuit 225 output a driving signal in accordance with the control data to a driver (not shown) of a left wheel motor 226 and a right wheel motor 227. The left wheel motor 226 and the right wheel motor 227 are driving sources of the rotation assistance means 28L, 28R.

Herein, a one arm drive wheelchair having a one side assistance drive type is described. The wheelchair described is used as a left wheel drive wheelchair. When a user of the wheelchair drives the left side hand rim 27L by his or her left arm, the left wheel axis 30 rotates, and a phase difference with respect to the rotations of the left wheel axis 30 and the right wheel axis 31 arises. Then, the ring gear 9 of the right wheel axis 31 rotates according to the phase difference. The rotation degree of the ring gear 9 is detected by the ring gear rotation degree detecting apparatus 29, and then, is supplied to the control means 34 as an electric signal. The control means 34 drives the right wheel 23R by controlling the rotation assistance means 28R, so that the phase difference is eliminated and becomes zero. Then, the wheelchair can go straight with one arm drive.

The above operation explains a case that the left arm drives the left side hand rim 27L. This is, however, not the only case in the present embodiment. If a left and right changing mode is set in the control means 34, it is easy to respond to a right wheel drive wheelchair. That is, when the user of the wheelchair drives the right side hand rim 27R by his or her right arm, it is easy to drive the rotation assistance means 28L according to the detected phase difference. In this case, only the mode of the control means 34 has to be changed from right from left. It is not necessary to change the mechanism.

It is also possible to assist both wheels 23L, 23R for the wheelchair under the condition that the control means 34 drives both rotation assistance means 28L, 28R according to the detected phase difference. A two-wheel assistance type wheelchair can be obtained by supplying proper driving power to the left wheel 23L and the right wheel 23R, so as to make the rotation degree of the ring gears 8, 9 zero. In this case, human power for driving the wheelchair can be reduced compared with a one side assistance mechanism.

It is also possible to improve straight moving stability using the phase difference detecting apparatus. The above-mentioned examples of the wheelchair identify the straight moving wheelchair by driving one of the hand rims 27L or 27R. A wheelchair for people who can use left and right arms but have difficulty rotating the hand rims 27L, 27R by equal power can be obtained using the same mechanism. This type of wheelchair can be obtained by supplying proper driving power to the left wheel 23L and the right wheel 23R, so as to make the rotation degree of the ring gears 8, 9 zero.

Only the straight moving method is described above. A turning movement or reverse moving movement is, however, also easily incorporated by using a conventional method like stopping assistance of one wheel or both wheels, or driving the left and right wheels so as to rotate in opposite directions. In a case that the wheelchair goes straight after turning, a position of the rotation free ring gear is not at a home position. Thus, it is necessary to set the position when the wheelchair urges to move straight as the home position. Then, the wheelchair may be controlled according to the detected rotation degree from the new home position of the rotation free ring gear.

Further, some examples of a wheelchair that has low detected speed range with respect to the phase difference are described above. The phase difference detecting apparatus of the present invention, however, has a wide detected speed range from a low speed to high speed. Accordingly, the phase difference detecting apparatus of the present invention can clearly also be applied to a device which generates a phase difference with respect to rotation at a high speed, e.g., a train, motor vehicle, and similar devices.

The present invention may be embodied in other specific forms without departing from the spirit or essential characteristics thereof. The present embodiment is therefore to be considered in all respects as illustrative and not restrictive, the scope of the present invention being indicated by the appended claims rather than by the foregoing description and all changes which come within the meaning and range of equivalency of the claims are therefore intended to be embraced therein.

The present application is based on Japanese Priority Document 9-278450 filed on Oct. 13, 1997, the contents of which are incorporated herein by reference.

What is claimed is:

1. A phase difference detecting apparatus, comprising:
    a frame;
    a first planetary gear train, said first planetary gear train including first elements of a first sun gear, a first ring gear, and a first planetary gear carrier, one first element of said first sun gear, said first ring gear, and said first planetary gear carrier is fixed to the frame, another first element is connected to a first rotating axis, and a final first element is unconnected to the frame and the first rotating axis;
    a second planetary gear train, said second planetary gear train including second elements of a second sun gear, a second ring gear, and a second planetary gear carrier, one second element of said second sun gear, second ring gear, and second planetary gear carrier corresponding to said first element of said first planetary gear train fixed to the frame is rotatably mounted, one second element corresponding to said first element of said first planetary gear train connected to the first rotating axis is connected to a second rotating axis, said second rotating axis rotating independently of said first rotating axis, and one second element is connected to the corresponding first element of said first planetary gear train unconnected to the frame and first rotating axis; and
    means for detecting a phase difference with respect to rotations of said first rotating axis and said second rotating axis by measuring a rotation degree of said second element corresponding to said first element of said planetary gear train fixed to the frame.

2. A phase difference detecting apparatus as recited in claim 1, wherein a gear ratio of each of said first and second sun gears, said first and second ring gears, and said first and second planetary gears are the same.

3. The phase difference detecting apparatus according to claim 1, wherein the first ring gear is fixed to the frame and the corresponding second ring gear is rotatably mounted, the first sun gear is connected to the first rotating axis and the corresponding second sun gear is connected to the second rotating axis, and the first planetary gear carrier is connected to the corresponding second planetary gear carrier.

4. The phase difference detecting apparatus according to claim 1, wherein the first planetary gear carrier is fixed to the frame and the corresponding second planetary gear carrier is rotatably mounted, the first sun gear is connected to the first rotating axis and the corresponding second sun gear is connected to the second rotating axis, and the first ring gear is connected to the corresponding second ring gear.

5. The phase difference detecting apparatus according to claim 1, wherein the first sun gear is fixed to the frame and the corresponding second sun gear is rotatably mounted, the first ring gear is connected to the first rotating axis and the corresponding second ring gear is connected to the second rotating axis, and the first planetary gear carrier is connected to the corresponding second planetary gear carrier.

6. The phase difference detecting apparatus according to claim 1, wherein the first planetary gear carrier is fixed to the frame and the corresponding second planetary gear carrier is rotatably mounted, the first ring gear is connected to the first rotating axis and the corresponding second ring gear is connected to the second rotating axis, and the first sun gear is connected to the corresponding second sun gear.

7. The phase difference detecting apparatus according to claim 1, wherein the first ring gear is fixed to the frame and the corresponding second ring gear is rotatably mounted, the first planetary gear carrier is connected to the first rotating axis and the corresponding second planetary gear carrier is connected to the second rotating axis, and the first sun gear is connected to the corresponding second sun gear.

8. The phase difference detecting apparatus according to claim 1, wherein the first sun gear is fixed to the frame and the corresponding second sun gear is rotatably mounted, the first planetary gear carrier is connected to the first rotating axis and the corresponding second planetary gear carrier is connected to the second rotating axis, and the first ring gear is connected to the corresponding second ring gear.

9. A wheelchair, comprising:
    a pair of wheels;
    a first rotating axis and a second rotating axis provided at a same axis and each connected with said pair of wheels; and
    a phase difference detecting apparatus including:
    a frame;
    a first planetary gear train, said first planetary gear train including first elements of a first sun gear, a first ring gear, and a first planetary gear carrier, one first element of said first sun gear, said first ring gear, and said first planetary gear is fixed to the frame, another first element is connected to a first rotating axis, and a final first element is unconnected to the frame and the first rotating axis;
    a second planetary gear train, said second planetary gear train including second elements of a second sun gear, a second ring gear, and a second planetary gear carrier, one second element of said second sun gear, second ring gear, and second planetary gear carrier corresponding to said first element of said first planetary gear train fixed to the frame is rotatably mounted, one second element corresponding to said first element of said first planetary gear train connected to the first rotating axis is connected to a second rotating axis, said second rotating axis rotating independently of said first rotating axis, and one second element is connected to the corresponding first element of said first planetary gear train unconnected to the frame and first rotating axis; and means for detecting a phase difference with respect to rotations of said first rotating axis and said second rotating axis by measuring a rotation degree of said second element corresponding to said first element of said planetary gear train fixed to the frame.

10. The wheelchair according to claim 9, further comprising:

means for giving assistance driving force to one of said first and second rotating axis according to the detected phase difference.

11. The wheelchair according to claim 9, further comprising:

means for giving assistance driving force to both said first rotating axis and said second rotating axis according to the detected phase difference.

12. The wheelchair according to claim 9, wherein the first ring gear is fixed to the frame and the corresponding second ring gear is rotatably mounted, the first sun gear is connected to the first rotating axis and the corresponding second sun gear is connected to the second rotating axis, and the first planetary gear carrier is connected to the corresponding second planetary gear carrier.

13. The wheelchair according to claim 9, wherein the first planetary gear carrier is fixed to the frame and the corresponding second planetary gear carrier is rotatably mounted, the first sun gear is connected to the first rotating axis and the corresponding second sun gear is connected to the second rotating axis, and the first ring gear is connected to the corresponding second ring gear.

14. The wheelchair according to claim 9, wherein the first sun gear is fixed to the frame and the corresponding second sun gear is rotatably mounted, the first ring gear is connected to the first rotating axis and the corresponding second ring gear is connected to the second rotating axis, and the first planetary gear carrier is connected to the corresponding second planetary gear carrier.

15. The wheelchair according to claim 9, wherein the first planetary gear carrier is fixed to the frame and the corresponding second planetary gear carrier is rotatably mounted, the first ring gear is connected to the first rotating axis and the corresponding second ring gear is connected to the second rotating axis, and the first sun gear is connected to the corresponding second sun gear.

16. The wheelchair according to claim 9, wherein the first ring gear is fixed to the frame and the corresponding second ring gear is rotatably mounted, the first planetary gear carrier is connected to the first rotating axis and the corresponding second planetary gear carrier is connected to the second rotating axis, and the first sun gear is connected to the corresponding second sun gear.

17. The wheelchair according to claim 9, wherein the first sun gear is fixed to the frame and the corresponding second sun gear is rotatably mounted, the first planetary gear carrier is connected to the first rotating axis and the corresponding second planetary gear carrier is connected to the second rotating axis, and the first ring gear is connected to the corresponding second ring gear.

* * * * *